Nov. 24, 1953　　　H. M. GEYER　　　2,660,027
DUAL DRIVE ACTUATOR
Filed Dec. 5, 1952

INVENTOR.
HOWARD M. GEYER
BY
*Willits, Hardman and Fehr*
ATTORNEYS

Patented Nov. 24, 1953

2,660,027

UNITED STATES PATENT OFFICE 2,660,027

DUAL DRIVE ACTUATOR

Howard M. Geyer, Dayton, Ohio, assignor to General Motors Corporation, Detroit, Mich., a corporation of Delaware Application December 5, 1952, Serial No. 324,274

13 Claims. (Cl. 60—6)

The present invention relates to actuators and more particularly to actuators adapted to be operated by two separate motivating means.

In actuators designed for operating control surfaces and other aircraft equipment, the desirability of providing two independent motivating means for operating the actuator is obvious. In addition, aircraft actuators preferably embody releasable locking means, automatically operable to maintain the movable actuator element, and perforce the load device associated therewith at a fixed position when the motivating means are inactive. The instant actuator employs fluid under pressure as a primary motivating means and electromotive force as the secondary or auxiliary motivating means. The auxiliary motivating means is only utilized if and when the primary motivating means fails or is otherwise rendered inoperative. Accordingly, one of my objects is to provide a locking actuator with primary and secondary means for effecting operation thereof.

The aforementioned and other objects are accomplished in the present invention by releasing the locking means upon actuation of the primary motivating means, and maintaining the locking means locked or effective upon actuation of the auxiliary motivating means. Specifically, the actuator includes a cylinder and a piston disposed therein for linear movement in either direction. The piston includes a rod that projects through an end wall of the cylinder, the rod being adapted for connection to either a relatively fixed support or a relatively movable load device. The opposite end wall of the cylinder is likewise adapted for connection to either the support or the load device, so that upon relative movement between the piston and cylinder, the load device will be positioned. A nonrotatable screw shaft is rigidly connected to the piston within the cylinder so as to be movable lineally therewith. The screw shaft constitutes a part of the well known ball-screw and nut assembly, the nut being rotatably journaled within the cylinder. Consequently, linear movement of the piston and screw shaft will effect rotation of the nut relative to the screw shaft.

To accomplish the objective of locking the load device in the fixed position when the motivating means are inactive, the edge of an axially extending annular portion of the nut is serrated to provide clutch teeth engageable with cooperable clutch teeth in the edge of a clutch ring normally restrained from rotation by the inactive auxiliary motivating means. The clutch ring, however, is adapted for longitudinal movement relative to the nut to release the locking means. Normally the clutch ring is spring urged in a direction where corresponding teeth of the locking means are engaged, thereby precluding rotation of the nut. A fluid pressure operated lock release piston is employed to relieve the spring bias on the clutch ring to permit release of the locking means upon application of fluid pressure to the actuator cylinder.

During fluid pressure operation of the actuator, the locking means are preferably released concurrently with the application of pressure fluid to either of the cylinder chambers. As the screw shaft is always restrained from rotation by reason of its attachment to the piston, linear movement of the piston in either direction may be effected by pressure fluid inasmuch as the nut is free to rotate relative to the screw shaft. If for any reason the fluid pressure system should become inoperative, the actuator piston and the load device may be adjusted by operation of the auxiliary motivating means constituted by a reversible electric motor. Upon energization of the motor, and while the locking means are engaged or in the locked condition, the clutch ring and, hence, the nut may be rotated in either direction by the motor. Accordingly, relative rotation will occur between the nut and screw shaft, thereby effecting linear movement of the shaft and piston assembly relative to the cylinder.

Further objects and advantages of the present invention will be apparent from the following description, reference being had to the accompanying drawing wherein a preferred embodiment of the present invention is clearly shown.

Figure 1:
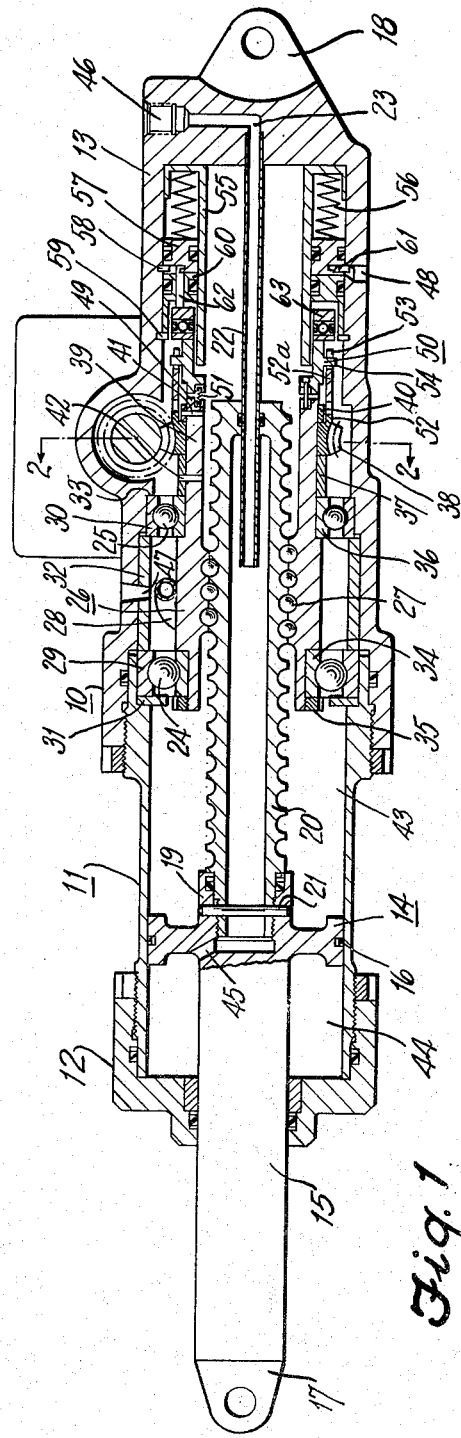
Fig. 1 is a longitudinal view partly in section and partly in elevation of a dual drive actuator.

With particular reference to Fig. 1, an actuator designated by the numeral 10 is shown including a cylinder 11 having attached thereto end cap members 12 and 13. Disposed within the cylinder 11 is a piston 14 having an axially extending rod 15 projecting through cap member 12. End cap members 12 and 13 threadedly engage opposite ends of a tubular member constituting the side walls of the cylinder 11. Suitable resilient seals are interposed between contiguous surfaces of the cap members and the tubular member forming the cylinder sidewalls to prevent leakage of fluid from the interior of the cylinder. The piston 14 is likewise provided with a seal 16, which insures fluid-tight engagement between the circumferential surface of the piston and the inner surface of the cylinder.

The free end of the piston rod 15 has a fixture 17 attached thereto, which is adapted for connection to either a relatively fixed support or a movable load device, not shown. Suitable sealing means are provided between the apertured end cap member 12 and the protruding piston rod 15. End cap member 13 is, likewise, provided with a fixture portion 18 adapted for connection to either a relatively fixed support or movable load device. In the instant disclosure, it is preferred to connect a fixture 18 to the fixed support and the fixture 17 to the movable load device for a reason which will appear more fully hereinafter.

The piston 14 has an axially extending annular portion 19 extending from the side opposite to that of rod 15. A hollow screw shaft 20 threadedly engages the inner periphery of the annular portion 19, the attachment of the screw shaft and the piston as an assembly being further enhanced by a cross pin 21. Accordingly, as the piston rod is adapted for connection to a load device, neither the piston nor the screw shaft is free to rotate relative to the cylinder. Moreover, all reciprocable movements of the piston 14 are accomplished by like movements of the screw shaft 20. The screw shaft 20 has a spirally grooved external periphery, the grooves being of substantially semi-circular configuration. The free end of the screw shaft 20 sealingly and slidingly engages a hollow transfer tube 22 having connection with a passage 23 within end cap 13.

Rotatably mounted in the cylinder 11 by bearing means 24 and 25 is a tubular nut 26. The inner periphery of the nut 26 has formed thereon a spiral groove of substantially semi-circular configuration, the nut forming one element of the ball-screw and nut connection to be described. The nut 26 threadedly engages the screw shaft 20 through the agency of a plurality of balls 27, thereby affording a substantially frictionless coupling therebetween. A tubular member 28 attached to the nut is utilized as a circulation passage for the balls 27 during relative rotary movement between the nut and the shaft. The screw shaft 20, the nut 26 and the ball 27 constitute the well known ball-screw and nut coupling. The outer races 29 and 30 of bearing means 24 and 25 are retained in position by an annular member 31, a sleeve 32 and a shoulder 33 formed on the inner surface of the cap member 13. When the cap member 13 is assembled to the tubular member forming the side walls of the cylinder 11, the outer races of the bearings 24 and 25 are rigidly retained in position. The inner race 34 of bearing 24 is retained in position between a shoulder formed on the nut and a ring 35 threadedly engaging a portion of the nut, while the inner race 36 of bearing 25 is retained in position between a shoulder formed on the nut and a sleeve 37 positioned between a worm gear 38 rotatably journaled on an axially extending annular portion 39 of the nut 26. The worm gear 38 is retained in position upon the portion 39 by means of an annular ring 40 suitably connected to the portion 39 by means of a pin 41. The sleeve 37 is likewise connected to the portion 39 by means of a pin 42.

The piston 14 divides the cylinder 11 into an extend chamber 43 and a retract chamber 44. The retract chamber 44 has connection through a passage 45 in the piston, the hollow screw shaft 20, the transfer tube 22, and the passage 23 to a retract port 46 formed in the end cap member 13. The extend chamber 43 has connection with an extend port 47 likewise formed within cap member 13. The cap member 13 is further provided with a lock release port 48 through which fluid pressure may be admitted to release the locking means, to be described, upon application of pressure fluid to either of the cylinder chambers. Preferably, though not necessarily, pressure fluid is admitted concurrently to the lock release port and either the retract or extend actuator chambers by any suitable valve means, not shown, such as the type disclosed in copending application, Serial No. 338,348, filed February 24, 1953, which application is a continuation of forfeited application Serial No. 258,938, filed November 29, 1951, in the name of James W. Light.

The locking means, which prevent movement of the piston 14 relative to the cylinder 11 in the absence of fluid pressure application to the cylinder, include the annular portion 39 of the nut 26. The annular portion 39 circumscribes the screw shaft 20, the outer edge of this portion being serrated to provide clutch teeth 49. Clutch teeth 49 are engageable with corresponding clutch teeth formed in a contiguously disposed edge of clutch ring 50. The contiguous surfaces of the toothed ends of the portion 39 and the clutch ring 50 also have a plurality of aligned pairs of recesses, in each of which a spring 51 is seated, each spring being of predetermined strength and normally urging the clutch ring 50 so that its toothed edge is moved out of gripping engagement with the cooperating toothed edge of the annular portion 39. The worm gear 38 has an axially extending annular extension 52 operatively connected to a ring 52a, which circumscribes clutch ring 50. The outer end of the ring 52a has a plurality of notches 53, each of which receives an extension 54 protruding radially from the clutch ring 50. Extensions or prongs 54 on the clutch ring 50 mesh with the notches 53 in the ring 52a and rotatably connect the worm gear 38 and the clutch ring 50. However, axial movement of the clutch ring 50 relative to the ring 52a is permitted. The worm gear 38 and its ring 52a, as heretofore mentioned, are journaled for rotation relative to the nut extension 39 by any suitable means, not shown, such as a sleeve bearing.

Attached to the inner surface of the end cap member 13 is a longitudinally extending tubular member 55. The member 55 is coaxially disposed within the hollow cap end member 13, thereby forming an annular chamber within which a plurality of springs 56 are disposed. The coil springs 56 are substantially stronger than the springs 51 and, consequently, the springs 56 are capable of overcoming any opposing effect offered by springs 51. The locking means are more particularly disclosed in my copending application, Serial No. 247,737, filed September 21, 1951, now Patent No. 2,620,683, issued December 9, 1952 and suffice it here to say that each of the springs 56 engages a ring piston 57, slidably disposed in the annular space between the tubular member 55 and the inner surface of the cap member 13. It is to be understood that the ring piston 57 is properly sealed to prevent fluid leakage thereby. A stop ring 58 situated in an internal groove of the end cap 15 limits movement of ring piston 57 under the urge of springs 56. Hereafter, the ring piston 57 will be referred to as the lock release piston. A second stop ring 59 is situated in an internal groove of the cap member 13, the ring 59 being longitudinally displaced from the ring 58. The ring 59 is engageable by a cylindrical extension of a member 60 supported within the annular space between tubular member 55 and the inner periphery of the cap member 13 between stop rings 58 and 59. The member 60 sealingly engages surfaces of the cap member 13 and the tubular member 55 forming an end wall of a lock release cylinder. A lock release chamber 61 is provided having communication with the lock release port 48 through which pressure fluid may be introduced to effect movement of the lock release piston 57 to the right, as viewed in Fig. 1.

The member 60 has a plurality of through passages arranged therein in an annular row, and in each one of the through passages a pin 62 is slidably supported. The pins 62 have one end anchored to the piston 57 so that the pins move relative to the member 60 upon movement of the piston 57. The pins 62 abut a thrust collar 63 slidably disposed within a cylindrical extension of member 60, the thrust collar 63 having component parts which engage the annular edge surface of the clutch ring 50 opposite the end edge provided with teeth. Accordingly, it is apparent that the springs 56 normally urge the piston 57 to the left, as viewed in Fig. 1, thereby urging the pins 62 to the left and into engagement with the thrust collar 63. In this manner the springs 56 urge the clutch ring 50 toward the toothed edge of the portion 39, so that the clutch ring 50 may be moved into engagement therewith. When the toothed edges of portion 39 and the clutch ring 50 are in engagement, relative movement between the clutch ring 50 and the nut 26 is precluded by means to be described. However, when pressure fluid is admitted to the lock release chamber 61, the lock release piston 57 will move to the right, as viewed in Fig. 1, thereby relieving the thrust of springs 56 from the clutch ring 50, and permitting the weaker springs 51 to move the clutch ring 50 relative to the nut 26, thereby freeing the nut for rotation relative to the clutch ring 50 by disengaging the toothed portions thereof.

Figure 2:
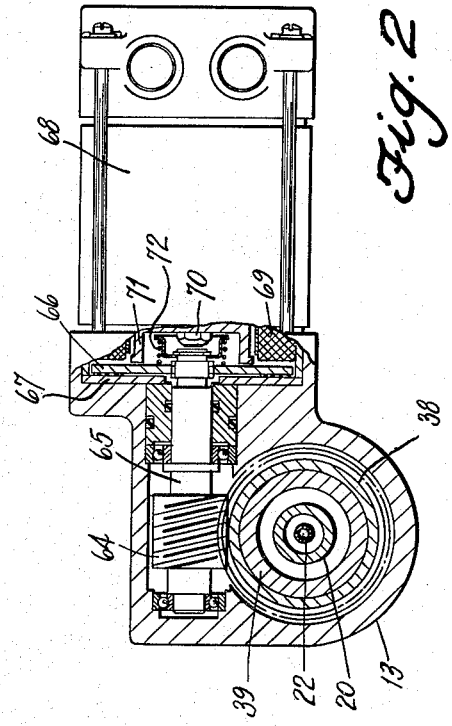
Fig. 2 is a view partly in section and partly in elevation taken on line 2—2 of Fig. 1.

With particular reference to Fig. 2, the worm gear 38 meshes with a worm 64 which is anchored to a shaft 65 journaled by bearing means within the cap member 13. The shaft 65 has attached thereto at one end a disc 66 which is composed of magnetic material and forms a component part of a magnetic clutch to be described. The disc 66 is keyed to the shaft 65 such that relative rotation between the disc and the shaft is precluded, but the disc may move axially relative to the shaft. One side of the magnetic clutch is frictionally engageable with a braking disc 67 secured within a portion of the cap member 13. The braking disc is restrained from rotation. A reversible electric motor is disposed within a housing 68 attached to the end cap 13. Also disposed within the housing 68 is an electromagnet 69. The construction of the motor and electromagnetic clutch assembly is more particularly disclosed in my aforementioned Patent No. 2,620,683, and suffice it here to say that the rotatable shaft 70 of the electric motor has a cup-shaped element 71 attached thereto which is rotatable within the magnetic field established by the electromagnet 69. When the electric motor within the housing 68 is deenergized by any suitable switch means, not shown, the electromagnet 69 is likewise deenergized and spring 72 will urge the magnetic disc 66 away from the cup-shaped member 71 into frictional engagement with the braking disc 67. Thus, when the motor is deenergized, shaft 65 is restrained against any rotative movement, the shaft 65 thereby preventing rotative movement of the clutch ring 50 within the actuator cylinder at all times when the motor is inactive. Thus, the locking means are rendered operative when the auxiliary motivating means are inactive. When the electric motor and the electromagnet are simultaneously energized, the magnetic field created by the electromagnet will attract the magnetic disc 66 rotatably secured to the shaft 65, and the disc 66 will move into engagement with the cup member 71 which is being rotated by the electric motor. Rotation of the disc 66 by the cup member 71 will be imparted to the shaft 65 and the nut 26 through the gear train constituted by the worm 64 and the worm gear 38 and the locked or engaged toothed edges of clutch ring 50 and annular portion 39.

*Operation*

As heretofore mentioned, fluid under pressure is utilized as the primary motivating means while the electric motor is only utilized if and when the fluid pressure system, not shown, for operating the actuator is rendered inoperative. During fluid pressure operation of the actuator, fluid under pressure is preferably concurrently admitted to one of the actuator chambers and the lock release chamber 61, while the other actuator chamber is exposed to drain. When fluid under pressure is admitted to the lock release chamber 61, the lock release piston 57 will move to the right, as viewed in the drawing, thereby relieving the thrust of the resilient means 56 from the clutch ring 50 and permitting the springs 51 to move the clutch teeth out of engagement. Thus, the nut 26 is free for rotation relative to the clutch ring 50. Accordingly, when pressure fluid is admitted to either the extend chamber 43 or the retract chamber 44, the piston 14 will undergo lineal movement relative to the cylinder 11 by reason of the concurrent application of pressure to one side thereof and exposure of the other side thereof to drain. Linear movement of the piston is permitted inasmuch as the nut 26 is free to rotate relative to the screw shaft 20, relative rotation between the nut and screw shaft permitting linear movement of the screw shaft and piston as an assembly.

As soon as the valve means, not shown, are actuated to stop the flow of pressure fluid to either of the actuator chamber, lock release chamber 61 is exposed to drain, whereby springs 56 will move the lock release piston 57 to the left, as viewed in Fig. 1, and the pins 62 will again impose the thrust of these springs upon the clutch ring 50. The thrust of springs 56 will overcome the separating force of springs 51 and, hence, the toothed portions of the locking means will be moved into engagement, thereby precluding rotation of the nut 26. Accordingly, linear movement of the piston 14 will be precluded inasmuch as no relative rotation can occur between the nut and screw shaft by reason of the nut being withheld from rotation by the deenergized electromagnetic clutch heretofore alluded to. The screw shaft 20 and the piston 14 are restrained from rotation by reason of the rod 15 being connected to the movable load device. In the instant design it is preferred to connect the piston 17 to the movable load device and the fixture 18 to the fixed support in that hydraulic connections must be made through end cap 13.

Should the fluid pressure system become inoperative for any reason, the actuator piston may be reciprocated by energization of the electric motor. When the electric motor is energized, the electromagnetic clutch is, likewise, energized and rotation will be imparted to the shaft 65, which rotation is transmitted through the worm 64 and the worm gear 38 to the nut 26 through the engaged teeth of the locking means. Thus, it is seen that rotation can only be imparted to the nut 26 by the electric motor when the locking means constituted by the toothed portion 39 and the clutch ring 50 are in the locked condition. When the nut 26 is rotated, linear movement of the piston and screw shaft as an assembly will be effected by relative rotation between the nut and screw shaft, the direction of movement being dependent upon the direction of rotation of the nut 26. Thus, a reversible electric motor is conveniently used to effect rotation of the nut 26 in either direction. However, it is to be understood that a unidirectional electric motor could be used if reversible gearing means were provided.

With an actuator of the present design, it is readily apparent that in the absence of fluid pressure application to the cylinder, and while the electric motor is deenergized, movements of the piston 14 relative to the cylinder 11 are prevented by the engaged locking means. When fluid pressure is used as the motivating means, the locking means must be released to permit rotation of the nut relative to the piston and screw shaft. However, when the electric motor is used as the motivating means, the locking means must be in the locked or engaged condition to permit rotation of the nut 26 relative to the screw shaft 20 through the locking means. It is further apparent that reciprocable movement of the piston within the cylinder can only be effected by relative rotary movement between the nut and screw shaft.

While the embodiment of the present invention as herein disclosed, constitutes a preferred form, it is to be understood that other forms might be adopted.

What is claimed is as follows:

1. A dual drive actuator including, in combination, a cylinder, a lineally movable piston in said cylinder capable of fluid pressure actuation in either direction, releasable locking means operatively associated with said piston for preventing movement of said piston when no fluid pressure is exerted thereon, and auxiliary driving means operatively connected to said locking means for effecting linear movement of said piston in either direction, said auxiliary means, when inactive, maintaining said locking means operative to prevent piston movement and, when active, operative to effect piston movement through said locking means.

2. A dual drive actuator including, in combination, a cylinder, a lineally movable piston disposed in said cylinder capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including a hollow member journaled in said cylinder for rotation relative to said piston, the said locking means in the locked condition, and an element immovably attached to said piston extending longitudinally through and operatively engaging said hollow member whereby relative rotation will occur between said element and member upon linear movement of said piston.

3. A dual drive actuator including, in combination, a cylinder having a lineally movable piston disposed therein capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including a hollow member journaled in said cylinder for rotation relative to said piston, the said locking means in the locked condition, and an element immovably attached to said piston extending longitudinally through and operatively engaging said hollow member whereby relative rotation will occur between said element and member upon linear movement of said piston, said driving means, when inactive, maintaining said locking means operative to prevent piston movement and, when active, operative to rotate said hollow member.

4. A dual drive actuator including, in combination, a cylinder having a lineally movable piston disposed therein capable of fluid pressure actuation in either direction, locking means operatively associated with said piston for preventing movement of said piston when no fluid pressure is exerted thereon, means operative upon application of fluid pressure to said cylinder for releasing said locking means to permit linear movement of said piston in either direction, and auxiliary driving means operatively connected to said piston for effecting linear movement thereof in either direction in lieu of fluid pressure actuation, the operative connection between said piston and said auxiliary means including a hollow member journaled in said cylinder for rotation relative to said piston, the said locking means in the locked condition, and an element immovably attached to said piston extending longitudinally through and operatively engaging said hollow member whereby relative rotation will occur between said element and member upon linear movement of said piston, said driving means, when inactive, maintaining said locking means operative to prevent piston movement and, when active, operative to rotate said hollow member.

5. A dual drive actuator including, in combination, a cylinder having a lineally movable piston disposed therein capable of fluid pressure actuation in either direction, a first fixture attached to said piston and projecting through one end wall of said cylinder, a second fixture attached to the other end wall of said cylinder, one of said fixtures being constructed and arranged for connection to a relatively fixed support, the other of said fixtures being constructed and arranged for connection to a relatively movable load device whereby relative linear movement between said piston and said cylinder will effect adjustment of said load device, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including a hollow member journaled in said cylinder for rotation relative to said piston, the said locking means in the locked condition, and an element immovably attached to said piston extending longitudinally through and operatively engaging said hollow member whereby relative rotation will occur between said element and member upon linear movement of said piston, said driving means, when inactive, maintaining said locking means operative to prevent piston movement and, when active, operative to rotate said hollow member.

6. An actuator including, in combination, a cylinder, a lineally movable piston in said cylinder capable of fluid pressure actuation in either direction, a nut rotatably journaled in said cylinder and operatively connected to said piston, the operative connection between said piston and nut including a screw shaft immovably attached to said piston and threadedly engaging said nut whereby relative rotation will occur between said nut and shaft in response to linear movement of said piston, releasable locking means operatively associated with said piston for holding said piston against movement when no fluid pressure is exerted upon said piston, and auxiliary driving means operatively connected with said locking means for effecting linear movement of said piston in either direction, said auxiliary means, when inactive, maintaining said locking means operative to prevent piston movement and, when active, operative to effect piston movement through the locking means.

7. An actuator including, in combination, a cylinder, a lineally movable piston in said cylinder capable of fluid pressure actuation in either direction, a nut rotatably journaled in said cylinder and operatively connected to said piston, the operative connection between said piston and member including a screw shaft immovably attached to said piston and threadedly engaging said nut whereby relative rotation will occur between said nut and shaft in response to linear movement of said piston, releasable locking means operatively connected with said nut for precluding rotation thereof relative to said screw shaft and, consequently, preventing linear movement of said piston when no fluid pressure is exerted upon said piston, and auxiliary driving means operatively connected with said locking means for effecting linear movement of said piston in either direction, said auxiliary means, when inactive, maintaining said locking means operative to prevent piston movement and, when active, operative to effect piston movement through the locking means by rotating the nut.

8. An actuator including, in combination, a cylinder, a lineally movable piston in said cylinder capable of fluid pressure actuation in either direction, a nut rotatably journaled in said cylinder and operatively connected to said piston, the operative connection between said piston and member including a screw shaft immovably attached to said piston and threadedly engaging said nut whereby relative rotation will occur between said nut and shaft in response to linear movement of said piston, locking means operatively associated with said piston for holding said piston against movement when no fluid pressure is exerted upon said piston, means operative upon application of fluid pressure to said cylinder for releasing said locking means to permit linear movement of said piston in either direction, and auxiliary driving means operatively connected with said locking means for effecting linear movement of said piston in either direction, said auxiliary means, when inactive, maintaining said locking means operative to prevent piston movement and, when active, operative to effect piston movement through the locking means.

9. The combination set forth in claim 8 wherein the auxiliary driving means comprises a reversible electric motor.

10. The combination set forth in claim 8 wherein the locking means include a toothed edge of the nut, a rotatable and longitudinally movable clutch ring having a toothed edge engageable with the toothed edge on said nut, and resilient means normally urging the toothed portions into engagement, said clutch ring normally having operative connection with said auxiliary driving means which are operative to hold said clutch ring against rotation when the auxiliary means are inactive.

11. The combination set forth in claim 10 wherein the means for releasing the locking means include a lock release cylinder, a lock release piston in said lock release cylinder capable of linear movement under the urge of fluid pressure, and means operatively interconnecting said clutch ring and piston whereby linear movement of said lock release piston under the urge of fluid pressure will effect longitudinal movement of said clutch ring out of engagement with the toothed portion of said nut.

12. An actuator assembly including, in combination, a cylinder, a reciprocative piston in said cylinder, a hollow member rotatably journaled in said cylinder and operatively connected to said piston, the operative connection between said piston and member including an element immovably attached to said piston, said element extending longitudinally through said hollow member and operatively engaging the same whereby relative rotation will occur between said member and element in response to reciprocative movement of said piston, and releasable locking means operatively associated with said hollow member and effective to prevent rotation of said hollow member at any position of the piston within the cylinder and, consequently, preventing reciprocative movement of said piston when the actuator is inactive.

13. An actuator including in combination, a cylinder, a lineally movable piston in said cylinder capable of fluid pressure actuation in either direction, a hollow member disposed in said cylinder and operatively connected to said piston for rotation relative to said piston, the operative connection between the piston and the member including an element operatively connected to said piston and extending longitudinally through said hollow member such that relative rotation will occur between said element and member in response to linear movement of said piston, releasable locking means operatively connected with the piston for holding said piston against movement when no fluid pressure is exerted upon said piston, and auxiliary driving means operatively connected with said hollow member for effecting linear movement of said piston in either direction, said auxiliary means, when inactive, maintaining said locking means operative to prevent piston movement and, when active, operative to effect piston movement with the locking means in the locked condition.

HOWARD M. GEYER.

References Cited in the file of this patent

UNITED STATES PATENTS

| Number | Name | Date |
| --- | --- | --- |
| 2,373,385 | Davie, Jr. | Apr. 10, 1945 |
| 2,476,376 | Laraque | July 19, 1949 |